(12) United States Patent
Adelsberger et al.

(10) Patent No.: US 11,170,236 B2
(45) Date of Patent: Nov. 9, 2021

(54) SYSTEM AND METHOD FOR IDENTIFYING PARKING SPACES AND PARKING OCCUPANCY BASED ON SATELLITE AND/OR AERIAL IMAGES

(71) Applicant: PARKBOB GMBH, Vienna (AT)

(72) Inventors: Christian Adelsberger, Vienna (AT); Ivan Kasanicky, Martin (SK); Nilüfer Cipa, Vienna (AT); Maryam Eslamikoulaei, Vienna (AT)

(73) Assignee: PARKBOB GMBH, Vienna (AT)

( * ) Notice: Subject to any disclaimer, the term of this patent is extended or adjusted under 35 U.S.C. 154(b) by 0 days.

(21) Appl. No.: 16/977,157

(22) PCT Filed: Feb. 28, 2019

(86) PCT No.: PCT/EP2019/055005
§ 371 (c)(1),
(2) Date: Sep. 1, 2020

(87) PCT Pub. No.: WO2019/166559
PCT Pub. Date: Sep. 6, 2019

(65) Prior Publication Data
US 2021/0064892 A1  Mar. 4, 2021

(30) Foreign Application Priority Data
Mar. 2, 2018 (EP) .................... 18159822

(51) Int. Cl.
*G06K 9/00* (2006.01)
*G06K 9/32* (2006.01)
*G06K 9/62* (2006.01)

(52) U.S. Cl.
CPC ..... *G06K 9/00812* (2013.01); *G06K 9/00651* (2013.01); *G06K 9/00798* (2013.01); *G06K 9/3233* (2013.01); *G06K 9/6215* (2013.01)

(58) Field of Classification Search
None
See application file for complete search history.

(56) References Cited

U.S. PATENT DOCUMENTS

2015/0104070 A1  4/2015  Tabb
2016/0063516 A1  3/2016  Terrazas et al.
(Continued)

FOREIGN PATENT DOCUMENTS

WO   2016174670 A1   11/2016

OTHER PUBLICATIONS

International Search Report dated Apr. 8, 2019 for corresponding International Application No. PCT/EP2018/055005.
(Continued)

*Primary Examiner* — Thomas S McCormack
(74) *Attorney, Agent, or Firm* — Tarolli, Sundheim, Covell & Tummino LLP

(57) ABSTRACT

Methods and system for identifying and evaluating on-street parking spots of an area are disclosed. The method comprises using at least one of satellite and aerial images and map data to identify vehicles, match them to street sections, compute on-street vehicle lanes, consolidate data from a plurality of images and identify parking lanes, as well as parking spots. The described system comprises a memory component, a processing component and an output component. Furthermore, a computer program executable by a computer and a non-transient computer-readable medium for identifying and evaluating on-street parking spots are described.

17 Claims, 8 Drawing Sheets

(56) References Cited

U.S. PATENT DOCUMENTS

| | | | |
|---|---|---|---|
| 2016/0078759 A1* | 3/2016 | Nerayoff | G06T 7/248 |
| | | | 701/3 |
| 2017/0116477 A1* | 4/2017 | Chen | G06K 9/00651 |
| 2017/0124378 A1* | 5/2017 | High | G06Q 10/06315 |
| 2018/0025238 A1 | 1/2018 | Belzner | |

OTHER PUBLICATIONS

Enriquez Fernando et al, "Existing Approaches to Smart Parking: An Overview" Medical Image Computing and Computer-Assisted Intervention—MICCAI 2015 : 18th International Conference, Munich, Germany, Oct. 5-9, 2015; Proceedings; [Lecture Notes in Computer Science; Lect.Notes Computer], Springer International Publishing, CH, XP047416324.

Young-Woo Seo et al, "Building lane-graphs for autonomous parking", Intelligent Robots and Systems (IROS), 2010 IEEE/RSJ International Conference On, IEEE, Piscataway, NJ, USA, p. 6052-6057, XP031920340.

* cited by examiner

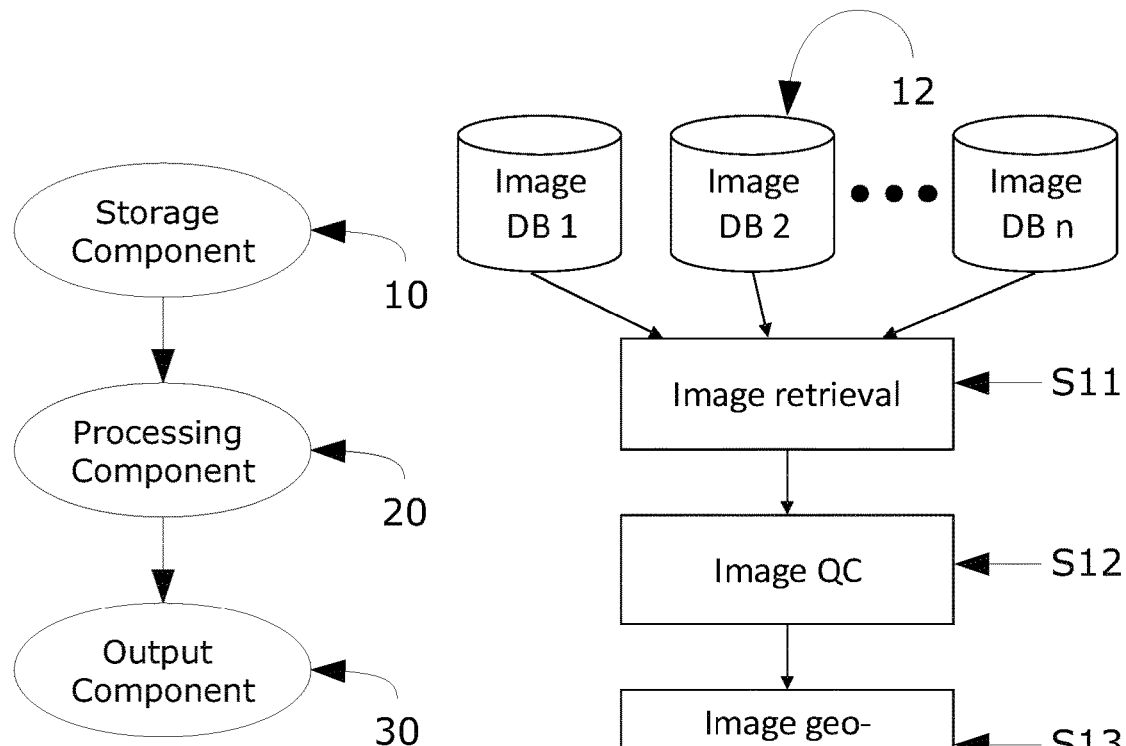
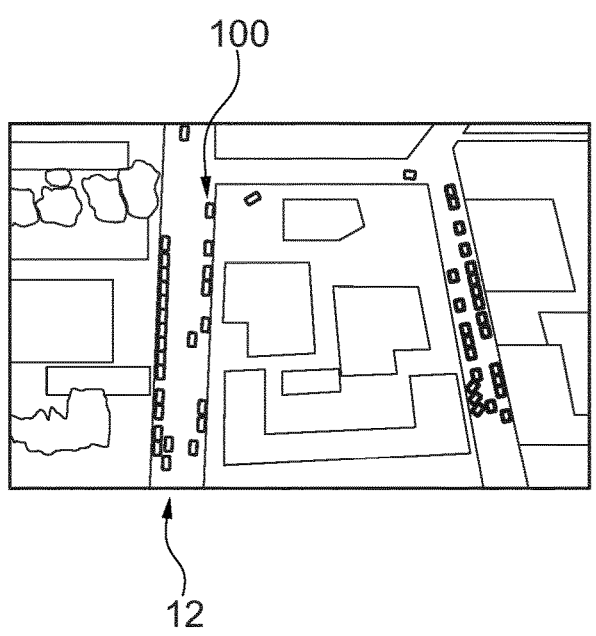
Fig. 4a
Fig. 4b

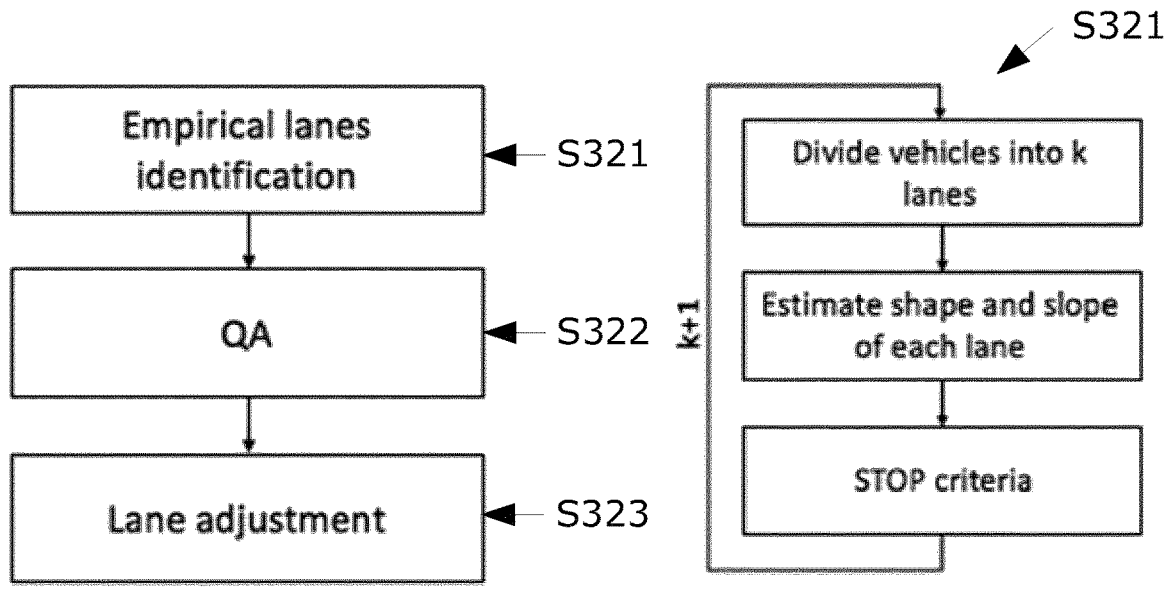
Fig. 5b
Fig. 5c
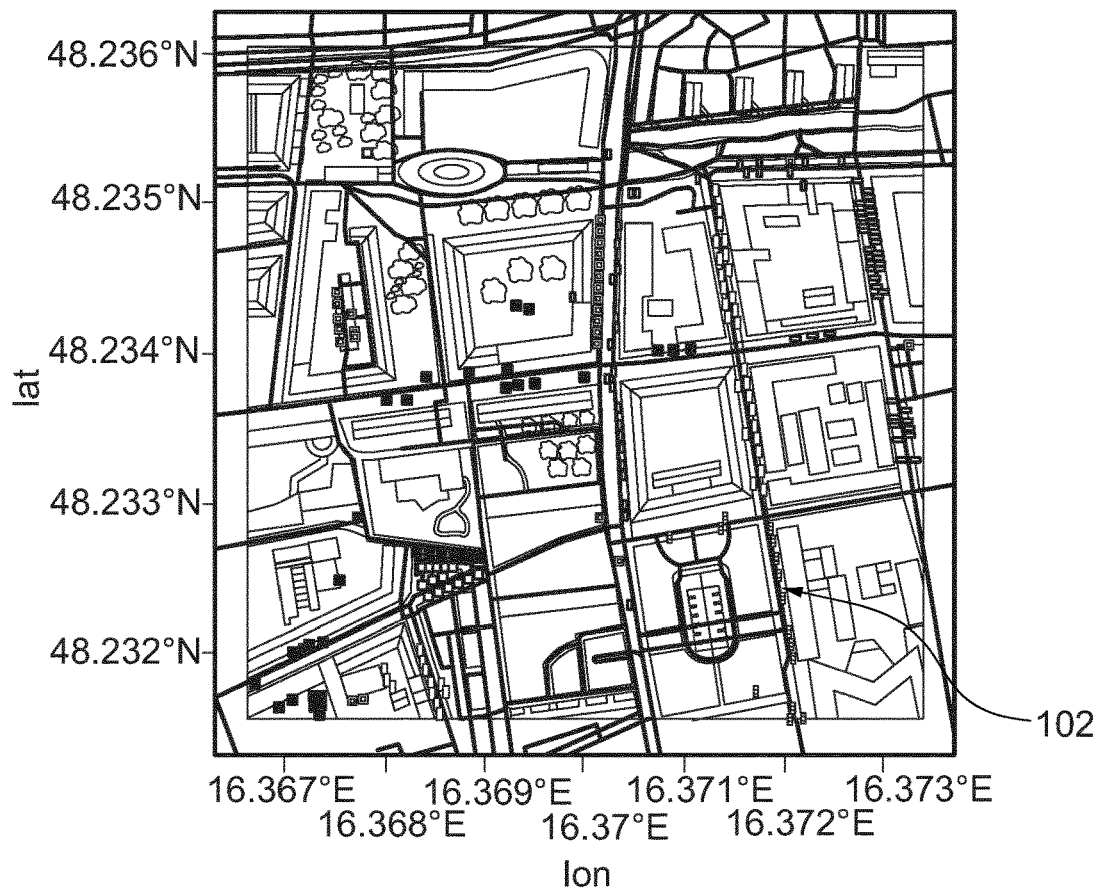
Fig. 5d

SYSTEM AND METHOD FOR IDENTIFYING PARKING SPACES AND PARKING OCCUPANCY BASED ON SATELLITE AND/OR AERIAL IMAGES

RELATED APPLICATIONS

The present application is a U.S. National Stage application under 35 USC 371 of PCT Application Serial No. PCT/EP2019/055005, filed on 28 Feb. 2019; which claims priority from EP Patent Application No. 18159822.8, filed 2 Mar. 2018, the entirety of both of which are incorporated herein by reference.

FIELD

The invention is directed towards identifying street parking spaces and street parking occupancy. The invention is further directed to processing satellite and/or aerial images to detect parking spaces and parking occupancy.

INTRODUCTION

The demand for parking spaces is continuously rising along with increasing car ownership. Street parking can be notoriously difficult to locate, particularly in inner city areas, unfamiliar neighborhoods and/or during times when demand is high. Currently, many services exist that provide users with estimates of parking occupancy, based on location, time, historical data and other parameters. To provide users with parking occupancy, such services need to collect data relating to street parking spots in a given region and preferably their typical occupancy. This is currently mainly done by regular manual surveys, street parking sensors or other similar means. Prototypes of using video from CCTV or dashboard cameras have also recently been proposed.

Satellite images have been used for various mapping purposes for some time. However, the resolution of satellite images that are publically and/or commercially available has generally not been high enough to extract detailed information, such as information relating to potential parking spaces and/or vehicles occupying them. Currently, new satellites such as WorldView 1, 2, 3 and 4 allow for a much more detailed resolution of about 30-50 cm per pixel, which allows for easier vehicle detection.

Recently, better methods of processing satellite images are being developed. For example, US patent application 2016/0063516 A1 discloses methods and apparatus to estimate commercial characteristics based on aerial images.

Due to the increased car ownership and use, as well as other factors, finding parking in cities is becoming more and more challenging. Providing only parking space occupancy in a given area (in percentage) may not be sufficient for a driver, as they also need information about how many individual spots are in a desired area. For example, it is easier to park a car on a street with 20 individual spots and 75% occupancy (that is, 5 free spots) than on a street with a total of 2 spots and 50% occupancy rate.

However, number of unique on-street parking spots in a city is usually not available, or the estimate is highly inaccurate. For example, in Seattle, a local government used fixed length of a parking spot to count the number of spots regardless of whether vehicles park there perpendicularly or in parallel. In addition, further information about how vehicles park on a street (e.g., in parallel or perpendicularly) is also often not digitally available.

SUMMARY

In light of the above, it is the object of the present invention to disclose a method of satellite and/or aerial image processing. It is also the object of the present invention to disclose methods of extracting specific information from satellite or aerial images, particularly information related to parking spaces and vehicles occupying them. It is also the object of the present invention to provide a map of parking spaces in a certain region or area based on the information extracted from satellite or aerial images. It is also the object of the invention to build and maintain a parking occupancy map based only on satellite or aerial images as an input. Furthermore, it is the object of the invention to provide a tool for comparing existing parking maps and for determining their accuracy based on the information extracted from satellite or aerial images.

Even further, the present disclosure proposes a new method of processing of satellite or aerial images that comprises:

1. Identifying on-street parking spots with additional features.
2. Identifying/validating basic parking rules that apply to the identified spots.
3. Extracting information regarding occupancies of the identified spots and size of the spots.
4. Updating and enhancing information about number of lanes within a street.

In a first embodiment, a method for identifying and evaluating on-street parking spots of an area based on at least one of satellite and aerial images of said area is disclosed. The method comprises retrieving and processing a plurality of at least one of satellite and aerial images by at least quality benchmarking and georeferencing the images. The method also comprises, for each image, detecting objects of interest comprising at least detected vehicles, computing street sections based on map data corresponding to the images, and assigning the detected objects to at least street sections. The method further comprises, for each street section, identifying on-street vehicle lanes based on the detected objects of interest. The method also comprises combining street sections based on the on-street vehicle lanes from the plurality of at least one of satellite and aerial images. The method further comprises, in the combined sections, identifying parking lanes and deriving individual parking spots comprised thereon.

The present method can be useful for users wishing to find a street parking space. It can also be useful for map providers, as an add-on showing expecting parking occupancy in an area. In one concrete example, the method can be used as part of an application for a user's personal mobile device (such as a smartphone) which assists the user with parking spot search. In another example, the method can be used as part of a service provided (for example, as an API) for third parties interested in monitoring parking occupancy in a city and the specific location of on-street parking spaces. For example, GPS manufactures, mapping and directions companies, car companies might all be interested in obtaining this data in order to provide their customers information related to parking spaces in a certain area.

As described in the present disclosure, the method can use satellite and/or aerial images as inputs. Satellite images refer to images taken by various public and/or commercial satellites in orbit. Aerial images can refer to images taken from planes, helicopters, air balloons and/or images taken by drones. While the present disclosure mostly exemplifies the use of satellite images for the parking spot identification, aerial images with a corresponding resolution can be used just as well.

Retrieving the images can refer to finding them in a database and/or finding them on a server and/or obtaining them from a publically accessible storage, a partner and/or a commercial provider. Processing the images can refer at least to verifying that the quality of the images is sufficient and georeferencing them. The quality itself can refer to the resolution, the level of obstruction from, for example, clouds and/or shadows and any blurring. Georeferencing can refer to determining the location or the area of the image. This step is useful for combining images with map data: since a precise location is needed for this.

The objects of interest generally comprise vehicles in the present disclosure, but can also refer to buildings, landmarks and/or other features easily recognizable in the images. These can be useful for additional georeferencing for example.

Map data can refer to publically and/or commercially available maps of areas of interest. For example, Open Street Map data can be used. Street sections refer to straight line segments that streets can be subdivided into. This is further explained and exemplified below.

On-street vehicle lanes refer to lanes present on a given traffic road. Parking lanes are included in the on-street vehicle lanes.

Parking spots can be referred here as on-street areas where vehicles are generally allowed to park. These can have a corresponding size and orientation assigned to them based on further analysis.

In some embodiments, the method can further comprise consolidating and interpreting data related to the identified individual parking spots. That is, as mentioned above, the detected parking spots can be further evaluated. Parking rules and regulations applying to the parking spots can also be determined based on the parking habits as seen in different images for example. Sizes can also be assigned to parking spots. For example, some street parking spots may be suitable only for cars below a certain maximum width or length based on street geometry. The orientation of the parking spot with respect to street orientation can also be computed. Further processing and determining of characteristics associated with the parking spots is also possible.

In some embodiments, the method can further comprise computing parking space occupancy of the identified parking lanes. That is, a parking space occupancy in terms of percentage and/or another metric can be computed and outputted to a prospective interested user. The occupancy can also be presented as a function of time, for example, by using historic occupancy. Various parameters can influence parking space occupancy. If data that is not real-time is used, forecasting of the parking occupancy can be performed based on time of day, any holidays, the precise location, events, weather and further factors.

In some embodiments, the method can further comprise computing the availability of parking spaces in a given neighborhood at a given time. As mentioned above, forecasting based on historic data can be used for this. Additionally or alternatively, real-time data (for example, images taken by drones) can be used to continuously update this information. Parking space availability can be very useful to the end user, who might, for example, decide to take a different mode of transport if there are few parking spaces available.

In some embodiments, the method can further comprise using a plurality of at least one of satellite and aerial images of an area taken over a certain period of time to identify at least time-dependent parking space availability. That is, the availability of on-street parking spots can depend, among other things, on the time of day (and/or day of the week). This dependency can be determined by using images taken at different times. Advantageously, an output with an estimated parking occupancy (that is, the amount of free and/or occupied spaces) can be output as a function of time.

In some embodiments, the method can further comprise identifying parking rules based on the interpreted identified individual parking spots. As mentioned above, this can be done, for example, by observing the parking behavior of vehicles in the parking spots (for example, some spots might only be available between certain hours, which can be deduced by looking at a plurality of images taken at different times).

In some embodiments, the method can further comprise providing the interpreted data to a user interested in finding an on-street parking spot. The user can be particularly interested in an estimate of parking occupancy at a certain time, or just on historical parking occupancy of a particular spot (and/or area).

In some embodiments, identifying on-street vehicle lanes can further comprise eliminating street sections inaccessible to vehicles. That is, the method can comprise detecting street sections inaccessible to vehicles (such as, for example, sidewalks and/or private roads). These street segments can then be discarded from the parking space computation.

In some embodiments, identifying on-street vehicle lanes can further comprise computing a closest street section for each detected vehicle and recursively identifying on-street vehicle lanes based on a plurality of vehicles present in each street section. The closest street section to each vehicle can be obtained, for example, by projecting the center of a bounding box or a bounding ellipse of a vehicle (that is, a geometrical object determining the bounds of the vehicle and generally obtained at the stage of detecting objects of interest in the images) to each street segment and selecting the one with the shortest resulting distance as the closest one. Note, that since street sections are determined based on map data, and vehicles are found in images, the two types of data need to be combined first. This can be done by superimposing the map data onto the images based on their georeferencing.

Recursive identification of on-street vehicles is further detailed below. Generally a plurality of hypotheses on the configuration of lanes can be generated and tested against all of the vehicles present in all of the images. In the end, only statistically significant lane hypotheses should remain.

In other words, the traffic or vehicle lanes (denoted here as on-street vehicle lanes) can be detected based on the cars detected in the images. Prior to this step, cars that are not in the street are preferably removed from consideration. This results in a robust and reliable way of locating traffic lanes, contributing to the general effectiveness of the present method.

In some such embodiments, the recursively identified on-street vehicle lanes can be quality controlled by at least comparing their slope with that of the respective street section. That is, the street sections detected in map data can serve as a sort of sanity check or guidance when the lanes are identified based on the vehicles from images. In other words, street segments can serve as a benchmark for the identified on-street vehicle lanes. Compliance with quality control can be determined, for example, based on a preset threshold of allowed deviation of the traffic lane slope from the street segment slope.

In some such embodiments, the recursively identified on-street vehicle lanes not compliant with the quality control can be further compared to similar lanes compliant with the quality control and adjusted to comply as well by recursively adapting their slope. Recursive slope adaptation can refer to performing an identification of the non-compliant on-street vehicle lanes again, and including similar lanes that are compliant as a reference. The similar lanes can be identified, for example, based on a similar bearing.

In some embodiments, combining street sections can comprise inputting a plurality of intersecting images, removing vehicles likely located off-street, and consolidating on-street vehicle lanes between the street sections. That is, images can be combined into intersecting visualization of a certain area. The on-street vehicle lanes can then also be combined based on the known relationships between the street sections (which can be known from the map data based on which the street sections are computed).

In some embodiments, combining street sections can further comprise computing a true number of lanes for each street. The true number of lanes can be computed by comparing and analyzing a plurality of images with possibly different lanes occupied in some of them. The large number of images makes it very likely that all of the lanes will be occupied in at least one of the images, which can then be confirmed as the true number of lanes.

In some embodiments, the method can further comprise assigning an identification parameter to each on-street vehicle lane. For example, the detected lanes can be simply numbered from left to right. The parking lanes are then generally the first and the last lane. However, some streets have only one or zero parking lanes.

In some such embodiments, identifying parking lanes can comprise filtering all vehicles located on inner lanes as identified by the identification parameter. The inner lanes are all lanes except the first and the last one as per the identification. In other words, the outermost lanes are examined.

In some embodiments, identifying parking lanes can further comprise computing the distance between the vehicles located in each on-street vehicle lane. This is particularly advantageous, as it can allow determining whether a particular road has parking lanes at all. Vehicles in parking lanes are generally located much closer to each other than vehicles in traffic lanes. Therefore, this allows for another robust way of identifying parking lanes.

In some embodiments, identifying individual parking spots can comprise computing a mean and minimal distance between neighboring vehicles. Parked cars usually try to minimize distance between neighboring vehicles, but this often ends up non-representative, since drivers might have different preconceptions about the desired distance between vehicles and/or due to the random parking spot filling, some vehicles might be parked closer and some further. Using both the mean and minimal distance to estimate true parking spots can include objectivity into the determination process.

In some embodiments, identifying individual parking spots can further comprise determining orientation of parked vehicles with respect to their respective parking lane. That is, some roads have parallel parking spaces, while others have perpendicular. Sometimes both are present on different stretches of the road and/or on different sides of the road. Based on the shape of the detected vehicle, its orientation can be determined.

In a second embodiment, a method for identifying on-street parking spots of an area based on at least one of satellite and aerial images of said area is disclosed. The method comprises retrieving and processing a plurality of at least one of satellite and aerial images by at least quality benchmarking and georeferencing the images. The method further comprises detecting vehicles and street sections in the georeferenced images. The method also comprises identifying on-street vehicle lanes based on the detected street sections and vehicles. The method further comprises identifying parking lanes and deriving individual parking spots on them. The method also comprises consolidating data from the plurality of at least one of satellite and aerial images of the area to compute an average parking occupancy in this area.

Advantageously, the present method outputs a parking occupancy of an area. The consolidated data can include images taken at different times, allowing to present a historical parking occupancy survey, as well as potentially a forecasted parking occupancy. As compared to the first embodiment, the present method is more specifically geared towards an end user. While the first embodiment advantageously allows to determine the existence of parking spaces in a given area, the present embodiment yields the parking occupancy. Each embodiments is useful on its own, and both can be combined. The features discussed above can also be applicable with respect to the present embodiment.

In some embodiments, the method can further comprise deriving rules related to parking from the consolidated data. That is, images taken at different times of day, day of the week, month, on a holiday or not can be processed, and parking rules can be obtained from them. For example, if certain parking spots allow for parking only during certain hours, this can be deduced. Such parking rules can then also be outputted together with the parking occupancy. For end users, this can be very useful, since different rules might indicate whether parking is allowed in a certain spot at a certain time or not.

In some embodiments, identifying on-street vehicle lanes can comprise recursively assigning vehicles on a given street section to possible on-street vehicle lanes until an optimal solution yielding at least one lane is obtained. That is, the detected vehicles can be added one by one to an algorithm which can compute a general fit for each progressive set of vehicles. The optimal solution can refer to a solution satisfying some minimum requirements such as a minimum probability of a lane being correctly identified.

In some embodiments, the method can further comprise consolidating the detected street sections with the respective identified lanes and identifying the parking lanes as the outermost lanes in the resulting consolidated street sections. The consolidating can be done based on a plurality of satellite images and on map data. That is, map data can be used to obtain street geometry, and this can be combined with a plurality of images in order to input any missing lanes onto the streets.

In some embodiments, the parking spot derivation can comprise at least computing distance between nearest neighbor vehicles on each parking lane, determining types of vehicles and parking orientation and obtaining an average parking spot with a corresponding size based on the above. That is, the individual parking spots can be identified based on the detected space between vehicles, their orientation and size. For example, if it is detected that a few vans or trucks are parked in a certain area, the true number of parking spots might be larger than what it appears to be, since those can take more space than an average vehicle.

In a third embodiment, a computer-implemented system for identifying on-street parking spots based on at least one of satellite and aerial images is disclosed. The system comprises a storage component configured to store a plurality of at least one of satellite and aerial images and map data. The system also comprises a processing component configured for the following operations or uses.

The processing component is configured for retrieving and processing a plurality of at least one of satellite and aerial images from the storage component by at least quality controlling and georeferencing the images. The processing component is also configured for detecting objects of interest comprising at least detected vehicles for each image, computing street sections based on map data corresponding to the images, and assigning each detected object to a street section for each street section, identifying on-street vehicle lanes based on the detected objects of interest. The processing component is also configured for combining street sections based on the on-street vehicle lanes from the plurality of at least one of satellite and aerial images. The processing component is also configured for identifying parking lanes and individual parking spots comprised thereon in the combined sections;

The system further comprises an output component configured to output the individual parking spots determined by the processing component.

The system can be implemented, for example, via a server (either local or distributed, such as a cloud server).

The memory component can comprise a physical memory storage device such as a hard drive. It can also comprise memory located on remote servers or distributed memory.

The output component can comprise an application for a user's personal computing device (such as a smartphone) that assists a user with parking spot finding. Additionally or alternatively, the output component can comprise an interface, such as an API, for third parties (that is, partners, business users or other such entities) to obtain access to known parking spots in a given area and optionally the parking occupation.

The features and steps described in relation to the method embodiments can generally be applied to the system as well, with the processing component being configured to perform the additional tasks.

In a fourth embodiment, a computer program comprising instructions is disclosed. When the program is executed by a computer, it causes the computer to carry out the method described in any of the previous embodiments.

In a fifth embodiment, a non-transient computer-readable medium comprising instructions is disclosed. When executed by a computer, it causes the computer to carry out the method described in any of the previous embodiments.

The present invention is also defined by the following numbered embodiments.

Below is a list of method embodiments. Those will be indicated with a letter "M". Whenever such embodiments are referred to, this will be done by referring to "M" embodiments.

M1. A method for identifying and evaluating on-street parking spots (152, 152') of an area based on at least one of satellite and aerial images (14) of said area, the method comprising retrieving and processing a plurality of at least one of satellite and aerial images (14) by at least quality benchmarking and georeferencing the images (14); and for each image (14), detecting objects of interest (100) comprising at least detected vehicles (100), computing street sections (110) based on map data (16) corresponding to the images (14), and assigning the detected objects (100) to at least street sections (110); and for each street section (110), identifying on-street vehicle lanes (120, 120') based on the detected objects of interest (100); and combining street sections (110) based on the on-street vehicle lanes (120, 120') from the plurality of at least one of satellite and aerial images (14); and in the combined sections (110), identifying parking lanes (150) and deriving individual parking spots (152, 152') comprised thereon.

M2. The method according to the preceding embodiment further comprising consolidating and interpreting data related to the identified individual parking spots (152, 152').

M3. The method according to the preceding embodiment further comprising computing parking space occupancy of the identified parking lanes (150).

M4. The method according to any of the two preceding embodiments further comprising computing the availability of parking spaces (152, 152') in a given neighborhood at a given time.

M5. The method according to any of the three preceding embodiments further comprising using a plurality of at least one of satellite and aerial images (14) of an area taken over a certain period of time to identify at least time-dependent parking space availability.

M6. The method according to any of the four preceding embodiments further comprising identifying parking rules based on the interpreted identified individual parking spots (150, 152').

M7. The method according to any of the four preceding method embodiments further comprising providing the interpreted data to a user interested in finding an on-street parking spot (152, 152').

M8. The method according to any of the preceding method embodiments wherein identifying on-street vehicle lanes (120, 120') further comprises eliminating street sections (110) inaccessible to vehicles.

M9. The method according to any of the preceding method embodiments wherein identifying on-street vehicle lanes (120, 120') further comprises computing a closest street section (110) for each detected vehicle and recursively identifying on-street vehicle lanes (120, 120') based on a plurality of vehicles present in each street section (110).

M10. The method according to the preceding embodiment wherein the recursively identified on-street vehicle lanes (120, 120') are quality controlled by at least comparing their slope with that of the respective street section (110).

M11. The method according to the preceding embodiment wherein the recursively identified on-street vehicle lanes (120, 120') not compliant with the quality control are further compared to similar lanes compliant with the quality control and adjusted to comply as well by recursively adapting their slope.

M12. The method according to any of the preceding method embodiments wherein combining street sections (110) comprises inputting a plurality of intersecting images (14), removing vehicles likely located off-street, and consolidating on-street vehicle lanes (120, 120') between the street sections (110).

M13. The method according to any of the preceding method embodiments wherein combining street sections (110) further comprises computing a true number of lanes for each street.

M14. The method according to any of the preceding method embodiments further comprising assigning an identification parameter to each on-street vehicle lane (120, 120').

M15. The method according to any of the preceding method embodiments and with the features of embodiment M14 wherein identifying parking lanes (150) comprises filtering all vehicles (100) located on inner lanes (140) as identified by the identification parameter.

M16. The method according to any of the preceding method embodiments wherein identifying parking lanes (150) further comprises computing the distance between the vehicles (100) located in each on-street vehicle lane (120, 120').

M17. The method according to any of the preceding method embodiments wherein identifying individual parking spots (152, 152') comprises computing a mean and minimal distance between neighboring vehicles (100).

M18. The method according to any of the preceding method embodiments wherein identifying individual parking spots (152, 152') further comprises determining orientation of parked vehicles with respect to their respective parking lane (150).

M19. A method for identifying on-street parking spots (152, 152') of an area based on at least one of satellite and aerial images (14) of said area, the method comprising retrieving and processing a plurality of at least one of satellite and aerial images (14) by at least quality benchmarking and georeferencing the images (14); and detecting vehicles (100) and street sections (110) in the georeferenced images (14); and identifying on-street vehicle lanes (120, 120') based on the detected street sections (110) and vehicles (100); and identifying parking lanes (150) and deriving individual parking spots (152, 152') on them; and consolidating data from the plurality of at least one of satellite and aerial images (14) of the area to compute an average parking occupancy in this area.

M20. The method according to the preceding embodiment further comprising deriving rules related to parking from the consolidated data.

M21. The method according to any of the preceding two embodiments wherein identifying on-street vehicle lanes (120, 120') comprises recursively assigning vehicles (100) on a given street section to possible on-street vehicle lanes (120, 120') until an optimal solution yielding at least one lane (120, 120') is obtained.

M22. The method according to any of the preceding three embodiments further comprising consolidating the detected street sections (110) with the respective identified lanes (120, 120') and identifying the parking lanes (150) as the outermost lanes in the resulting consolidated street sections (110).

M23. The method according to any of the preceding four embodiments wherein the parking spot derivation comprises at least computing distance between nearest neighbor vehicles (100) on each parking lane (150), determining types of vehicles and parking orientation and obtaining an average parking spot (152, 152') with a corresponding size based on the above.

Below is a list of system embodiments. Those will be indicated with a letter "S". Whenever such embodiments are referred to, this will be done by referring to "S" embodiments.

S1. A computer-implemented system for identifying on-street parking spots (150, 152') based on at least one of satellite and aerial images (14), the system comprising a storage component (10) configured to store a plurality of at least one of satellite and aerial images (14) and map data (16); and a processing component (20) configured for retrieving and processing a plurality of at least one of satellite and aerial images (14) from the storage component (10) by at least quality controlling and georeferencing the images (14); and for each image (14), detecting objects of interest (100) comprising at least detected vehicles (100), computing street sections (110) based on map data (16) corresponding to the images (14), and assigning each detected object (100) to a street section (110) for each street section (110), identifying on-street vehicle lanes (120, 120') based on the detected objects of interest (100); and combining street sections (110) based on the on-street vehicle lanes (120, 120') from the plurality of at least one of satellite and aerial images (14); and in the combined sections (110), identifying parking lanes (150) and individual parking spots (152, 152') comprised thereon;

an output component (30) configured to output the individual parking spots (152, 152') determined by the processing component (20).

Below is a list of computer program embodiments. Those will be indicated with a letter "C". Whenever such embodiments are referred to, this will be done by referring to "C" embodiments.

C1. A computer program comprising instructions which, when the program is executed by a computer, cause the computer to carry out the method of any of the preceding method embodiments.

Below is a list of computer storage embodiments. Those will be indicated with a letter "T". Whenever such embodiments are referred to, this will be done by referring to "T" embodiments.

T1. A non-transient computer-readable medium comprising instructions which, when executed by a computer, cause the computer to carry out the method of any of the preceding method embodiments.

Some aspects of the present invention are discussed in a more detailed and quantitative way below.

Note, that the present disclosure describes detailed ways of extracting parking space information from satellite images. However, the method can be analogously used with aerial images. For example, images taken from planes, balloons or drones can be used as an input in addition to or instead of satellite images.

Vehicle Identification

As a first part of the present method, vehicles are identified in satellite images. The input for this comprises satellite images of a defined area. The output comprises a list of identified vehicles with (at least) the following attributes for each vehicle:

1. coordinates (latitude/longitude) of a bounding box (that is, a smallest rectangle comprising the whole vehicle), 2. latitude and longitude of a centroid (that is, a geometric center) containing the vehicle, 3. vehicle category (such as a personal vehicle, a van, a truck, a trailer etc), 4. vehicle orientation, (that is, the angle between the horizontal axis and the major axis of a bounding ellipse fitted to the vehicle).

The output of the vehicle detection in satellite images can be obtained in the form of GeoJSON. Vehicle identification from aerial/satellite image is a well-known problem, and current state of the art is to use recurrent neural networks (also known as Deep Learning techniques). The accuracy of this method depends mainly on the size of training data sets, i.e., number of the annotated images, that is used to train the network. To satisfy this requirements, all available sources of annotated images, e.g., ImageNet, are used. In addition, training sets containing a specific situation (e.g. vehicles in shadows) might be manually created.

Vehicle Map Matching

Information obtained from the previous module, that is, the georeferenced vehicles with further attributes is input into this module. Further inputs can include a table containing geometries of each streets and additional features available for each street (e.g., street width, number of traffic lanes, vehicles accessibility, parking rules, etc.). Planar projection appropriate for the area can also be an input.

The output can comprise a table containing simple sections with following columns:
1. section geometry in latitude/longitude,
2. section geometry in planar coordinates,
3. section ID,
4. additional useful features described below The output can also comprise a table containing identified vehicles with following columns:
1. center point and bounding box of each vehicle in latitude/longitude,
2. center point and bounding box of each vehicle in planar coordinates,
3. ID of closest simple section to the vehicle,
4. distance of the vehicle to the closest section,
5. side (left/right) on which the vehicle is located.

Note, that simple sections are described below.

Street geometry can be defined by at least two spatial points, and, in most cases, it is defined by many more points. For example, see FIG. 4c illustrating this. If a street geometry is defined using more than two points, it needs to be divided into simple sections such that exactly two points define each simple section (start and end).

The above procedure can be performed for each street.

Each simple section is then equipped with a unique ID and additional useful features such as:
1. length of the section,
2. bearing (orientation) of the section with values from −90 to 90 degrees,
3. additional features inherited from the street geometry (e.g., number of on-street vehicle lanes).

Finally, each simple section is converted into appropriate planar coordinates.

For a given vehicle, represented by its center point (x,y), its distance to simple sections from the previous section can be minimized. This can be expressed as $$\underset{s \in S}{\operatorname{argmin}} dist((x, y), s)$$

where S represents a set of all simple sections, and dist is a function that returns a distance (in meters) for a pair of spatial objects.

Note, that the following minimization is preferably performed in planar coordinates.

An exemplary result of this step is shown in FIG. 5d, which shows an exemplary output of a vehicle map section matching procedure. Vehicles matched to the same section are marked with the same color in the figure.

When a closest section for each vehicle is identified, it should be determined which side of the sections the vehicle is located on. This is performed by using the following procedure.

1. For a vehicle center point (x,y), find the projection of this point to the closest section s; and denote it $(\hat{x}, \hat{y})$:
2. Compute the angle between line s and a line going through points (x,y) and $(\hat{x}, \hat{y})$, and denote it $\alpha$.

If $\alpha < 0$, then the vehicle is located on the left side. If $\alpha > 0$, then the vehicle is located on the right side.

This is illustrated, for example, in FIG. 5e, which shows vehicles matched to a section, and connected to their projection onto the section. Vehicles identified to be on the different sided are marked using different colors.

On-Street Vehicle Lane Identification

As an input, all of outputs from vehicle map matching are taken. This module outputs a number of different on-street vehicle lanes t. It further outputs a table that contains all vehicles, and an ID number of the lane that each vehicle belongs to.

Denote $v_1, \ldots, v_k$ the vehicles assigned to a section s, and denote $$d_j = \operatorname{dist}(v_j, s), j=1, \ldots, k.$$

As before, the center of the vehicle v projected onto the section s is denoted by $(\hat{x}_j, \hat{y}_j)$.

If vehicles $v_1, \ldots, v_k$ are located in t lanes, and, without loss of generality, assuming that there exist numbers $$1 = j_1 \le j_2 < \ldots < j_{t-1} \le j_t = k$$

such that vehicles $v_{j_i}, v_{j_i+1}, \ldots, v_{j_{i+1}}$ are on lane i, then $$y_j \approx a x_j + \delta_{ij} b_i, j=1, \ldots, k,$$

where $\delta_{ij} = 1$ if vehicle v is in lane i and 0 otherwise, and a, $b_1, \ldots, b_t \in \mathbb{R}$.

There are a number of difficulties to overcome at this point in the procedure.
1. The number of traffic lines t is unknown, so the total number of parameters to estimate is unknown.
2. A priori, it is not clear which vehicle is in which lane, so a plurality of combinations need to be verified.
3. There are errors in the available data (such as geolocation errors for example).

To illustrate difficulties with estimating parameters a, $b_1, \ldots, b_t$, assume that one assigns 10 vehicles to a plurality of traffic lines. The correct number of lanes is not known, so the parameters a, $b_1, \ldots, b_t$ need to be estimated for each $t=1, \ldots, 9$. Note, that at least two cars should be in one lane, or the parameters cannot be estimated. That is, for each t, there are $$\binom{10}{t}$$

options for assigning the vehicles to lanes. Therefore, there are $$\sum_{t=1}^{9} \binom{10}{t} = 1022$$

sets of possible parameters. If the number of vehicles is 20, there are more than a million possible sets of parameters. This problem can be addressed by combining hierarchical clustering with total least squares regression to bypass computational and other issues. For this, an oriented distance is defined for each vehicle as $$\bar{d}_j = (-1)^L (v_j) d_j,$$

where $$\mathbb{L}(v_j) = \begin{cases} 1 \text{ if vehicle } v_j \text{ is detected on the left side of the section,} \\ 0 \text{ if vehicle } v_j \text{ is detected on the right side of the section} \end{cases},$$

and $d_j$ is defined above. Then, for vehicles $v_i, \ldots, v_k$, the lane assignment algorithm can be performed as follows:

1. Run hierarchical clustering tree on $\overline{d_1}, \ldots, \overline{d_k}$.
2. Set t=1.
3. Cut tree from point 1 such that it divides vehicles into t clusters. Denote by $c_j$ the number of cluster to which vehicle j belongs.
4. Find $\tilde{a}, \tilde{b}_1, \ldots, \tilde{b}_t \in \mathbb{R}$ such that $$(\tilde{a}, \tilde{b}_1, \ldots, \tilde{b}_t) = \arg\min_{a, b_1, \ldots, b_t} \sum_{j=1}^{k} dist((x_j, y_j), \varphi_{a, c_j}(x_j, y_j)),$$

where $\varphi_{a,c_j}(x_j,y_j)$ is a projection of point $(x_j,y_j)$ onto the line with intercept $b_{c_j}$ and slope a.

5. Compute cost function $$L = \mathcal{L}(v_1, \ldots v_k, \tilde{a}, \tilde{b}_1, \ldots, \tilde{b}_t).$$

6. If L is higher than a predefined threshold, and t<k−2, then t=t+1 and the process is repeated from point 3.

For each vehicle $v_j$, its line number $c_j \in \{1, \ldots, t\}$ is obtained. Also obtained are the t+1 parameters $\tilde{a}, \tilde{b}1, \ldots, \tilde{b}_t$ that define the lines corresponding to on-street vehicle lanes.

Additional filtering and quality control can be performed to ensure that the assignment was done correctly.

For example, recall that vehicles $v_1, \ldots, v_k$ were matched to section s, and vehicle $v_j$ belongs to lane number $c_j$, which is defined using two real parameters a, $b_{c_j}$. Now, a line can be constructed passing through the middle point of section s and with a slope a. Such line obviously intersects with section s, but in general is not parallel to it. The angle between these two lines can be denoted γ. If γ is too large, the filtering can be done as follows:

1. Traffic line identification can be redone with a new bound on cost function and additional penalization (see bellow), or
2. Vehicles $v_1, \ldots, v_k$ can be removed from the dataset.

The adjustment of the cost function can be done as follows:

1. Identify similar sections, which passed the filtering, and denote this set $\mathcal{S}$.
2. Find the parameters $\tilde{a}', \tilde{b}'_1, \ldots, \in \mathbb{R}$ such that $$(\tilde{a}', \tilde{b}'_1, \ldots, \tilde{b}'_t) = \arg\min_{a, b_1, \ldots, b_t} \left( \sum_{j=1}^{k} dist((x_j, y_j), \varphi_{a, c_j}(x_j, y_j)) + \lambda \sum_{\delta \in S} \psi(a, \delta) \right),$$

where $\lambda \varepsilon \mathbb{R}$ is a penalization parameter and $\psi(a,\delta)$ is the difference between angle γ and an analogous angle defined for section S belonging to the set of similar section $\mathcal{S}$.

After completing the above steps vehicles, assigned to section s are either removed, or their assignment is adjusted.

The result of this module of the algorithm is illustrated, for example, in FIG. 6a.

Parking Lane Identification

As the next step of the algorithm, parking lanes are identified. The input to this module comprises the number of different on-street vehicle lanes, and well as the assignment of each vehicle to a specific lane. Furthermore, simple street sections are also inputted.

The output comprises vehicles that are identified to be parked and the definition of lanes that they are parked in.

Suppose I images are available, each with street sections $s_1, \ldots, s_S$. For each section s and each image I, there are vehicles $v_1^{s,i}, \ldots, v_{k_{s,i}}^{s,i}$ assigned to this section. The vehicles are assigned to on-street vehicle lanes $c_1^{s,i}, \ldots, c_{k_{s,i}}^{s,i}$, where $c_j^{s,i} \in \{1, \ldots, t^{s,i}\}$. In other words, $t^{s,i}$ is the number of lanes identified on section s on image i. Now, define a function $\Delta^{s,i}(m,n)$ that returns the distance between traffic lanes $m,n \in \{1, \ldots, t^{s,i}\}$, and numbers $\delta_1^{s,i}, \ldots, \delta_{t^{s,i}}^{s,i}$, where $\delta_m^{s,i}$ is the distance between lane m and the middle point of section s.

With this notation, the parking lanes can be identified based on the following:

1. Each section can have zero, one, two or more traffic lanes. Distance between these lanes has to fall into an interval that is estimated using all data and stored in an internal table.

Additional features from open source or commercial map data might be helpful to estimate this interval.

2. All values of $\delta_m^{s,i}$ must be within a defined range for all applicable values of s, i, m.

If both conditions are satisfied, lane m is marked as a parking lane.

Free Spot Identification

The input of this module comprises parked vehicles, parking lanes and the sectioning of map data (that is, the simple sections).

The output comprises the number of free parking spots for each section and the number of occupied spots for each section.

First, it is assumed that vehicles $v_1, \ldots, v_k$ have been assigned to a parking lane m that belongs to a section s. Denote by $\hat{v}_1, \ldots, \hat{v}_k$ the projection of the center point of vehicles to lane m to get the distance matrix D:

$$D = \begin{pmatrix} dist(v_1, v_1) & \ldots & dist(v_1, v_k) \\ \vdots & \ddots & \vdots \\ dist(v_k, v_1) & \ldots & dist(v_k, v_k) \end{pmatrix}.$$

If there are multiple intersecting images covering one lane, there are multiple matrices D. Based on minimal values of D (excepting the diagonal ones), the minimal distance between two neighboring parking spots can be derived. This distance can be used to mark parking spots between any two cars sufficiently far away from each other. This is, for example, illustrated in FIG. 7c. The minimal value distance between neighboring parking spots can be stored in an internal table as an additional property of the section. In addition, this property can be used to determine the number of spots on similar streets with fever vehicles observed.

The present technology will now be discussed with reference to the accompanying drawings.

BRIEF DESCRIPTION OF THE DRAWINGS

FIG. 2 schematically depicts an embodiment of a system configured to identify parking spaces according to one aspect of the invention;

FIG. 3 depicts an overview of step S1 as depicted in FIG. 1a in more detail;

FIGS. 4a and 4b depict embodiments of step S2 as depicted in FIG. 1a, detailing image segmentation and object detection in satellite images;

FIGS. 5a to 5f depict embodiments of step S3 as depicted in FIG. 1a, detailing the identification of on-street traffic lanes based on the detected objects;

DESCRIPTION OF EMBODIMENTS

Figure 1A:
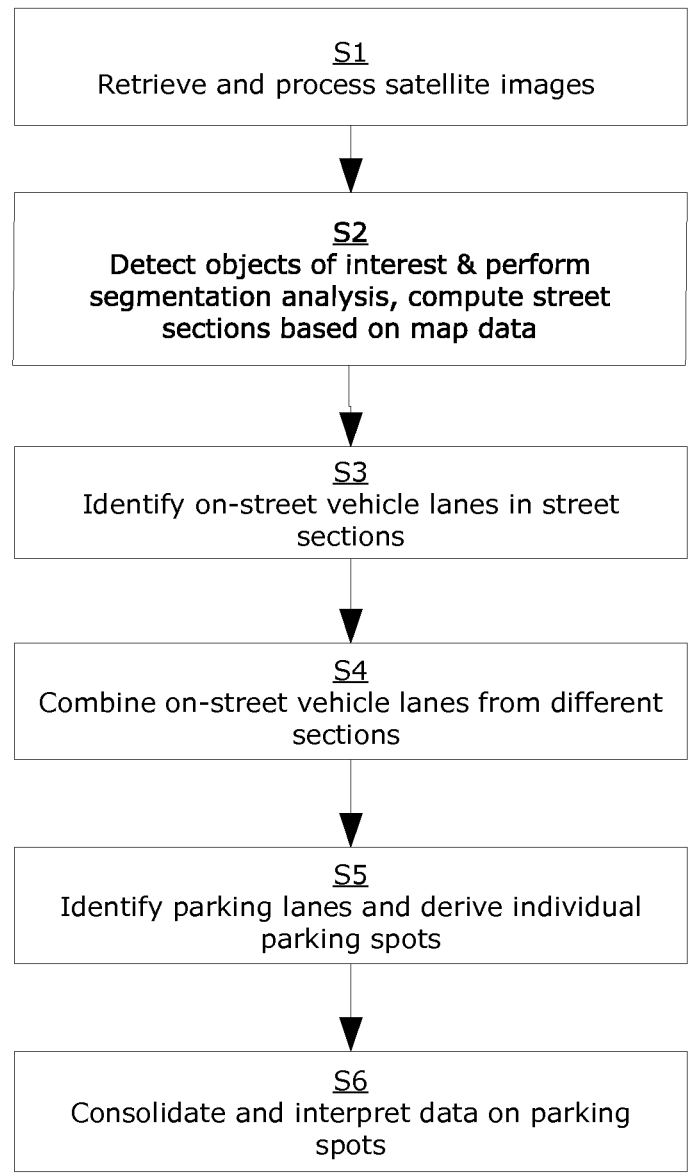
FIG. 1a depicts an embodiment of a method for identifying parking spaces based on satellite images according to one aspect of the invention.

FIG. 1a depicts an embodiment of a method according to one aspect of the invention. The method comprises using satellite images to identify on-street parking spaces. The present method is particularly useful for mapping parking areas in a city, providing an overview of a parking situation to interested parties, or generating forecasts regarding parking occupancy.

In step S1, satellite images are retrieved and processed. This can comprise retrieving images from a plurality of storage systems such as databases, harmonizing them, quality controlling them, geotagging them and further prepare them to be used as part of the method.

In step S2, objects of interest are detected in the images. Those typically comprise vehicles, but can also comprise landmarks, buildings, or other objects allowing for further data extraction and use. Furthermore, segmentation analysis is performed on each satellite image.

That is, a plurality of image surfaces is identified, a plurality of street sections is identified in map data, and each identified object is assigned to a street section. This is further detailed below.

In step S3, on-street traffic lanes are identified among the street sections. This can be performed by analyzing the detected vehicles and fitting them to a plurality of lines that represent the lanes.

In step S4, on-street traffic lanes from different street section are combined. This can be done both per image (provided multiple street sections belonging to the same street are present in the image, or there are multiple sections with similar properties, e.g., heading of the section) and for a plurality of images covering a certain area. Note, that for this step, a reference map such as Open Street Map can be used to assist with the combining.

In step S5, parking lanes are identified among the on-street traffic lanes. Furthermore, individual parking spots are derived.

Step S6 comprises consolidating and interpreting data related to parking spots. For example, images depicting the same area at different times can be analyzed. The obtained data can be processed to obtain an average or time-based parking occupancy in a given area. Further, different areas can be combined to obtain an on-street parking map for a neighborhood, a town, a city, a country and/or the world.

Given the number of parking spots found in step or submodule S5, the following information can be extracted:

1. Additional features about the street from images (number of lanes, information which lanes are used for driving and which are not, type of parking on street—parallel, orthogonal).
2. Map off all places within an area where people tend to park a car.
3. Usual rules that govern parking behaviour (which might differ from legal rules in some areas).
4. Number of usual parking spots on a given street.
5. Typical parking occupancy of a street.
6. Areas where people do not park their cars.

Note, that although the present method is geared towards satellite images, aerial images can also be used in the same manner to obtain on-street parking spots. Furthermore, a combination of aerial and satellite images is possible as well. For example, images obtained by drones can be used with the present method.

Figure 1B:
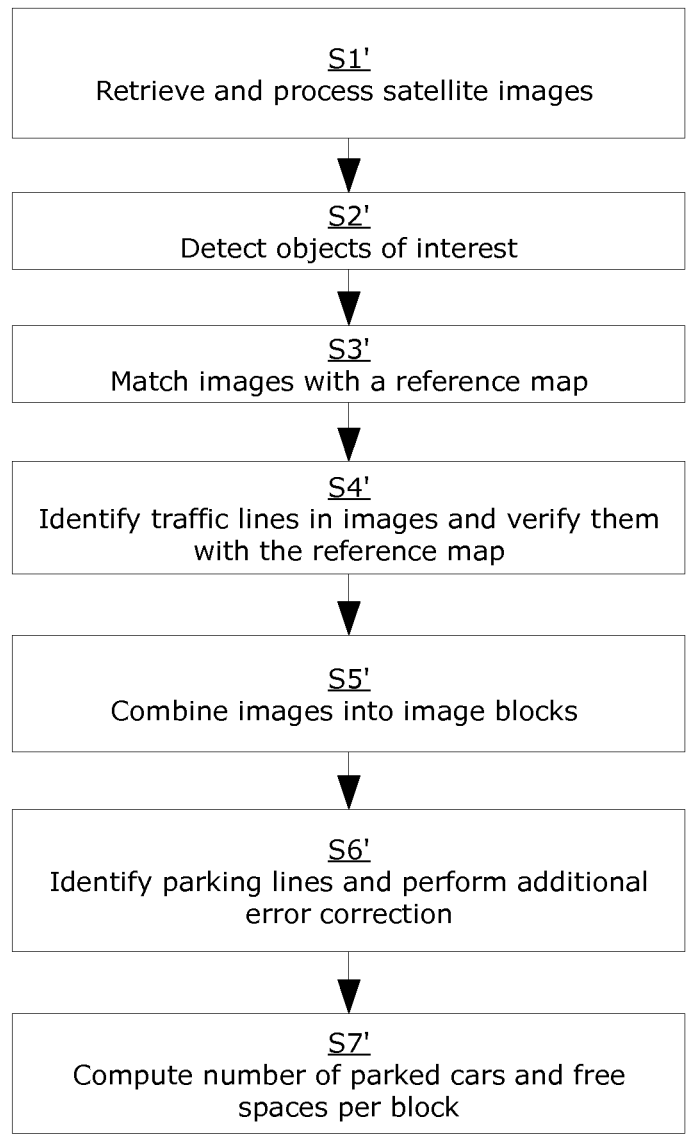
FIG. 1b depicts another method according to one aspect of the invention.

FIG. 1b depicts an alternative method for on-street parking spot identification based on satellite images.

As before, satellite images are retrieved and processed in step S1'. Following this, objects of interest (preferably at least vehicles) are detected in S2'. In S3', images are matched with a reference map. That is, satellite image streets are matched with a known map of the area, such as, for example, Open Street Map. Then, traffic lines in images are identified and verified with the reference map in S4'. In S5', the images are combined into image blocks which correspond to a certain area or patch of a map. In the image blocks, parking lines are identified and additional error correction is performed as part of step S6'. In step S7', the number of parked cars and free spaces per image block is computed. Note, that lines are used here interchangeably with lanes.

FIG. 2 depicts a schematic embodiment of a system for identifying on-street parking spaces based on satellite images. The system can comprise at least a storage component 10, a processing component 20, and an output component 30. The system can be implemented on a server, or on a local computing device such as a personal computer. The system can be implemented as a standalone software-based tool for identifying on-street parking. Additionally or alternatively, the system can be implemented as part of an app which assists users with locating an on-street parking spot. The system can also be implemented as part of driver assistance systems and/or navigational hardware and software.

The storage component 10 can comprise local or online databases comprising satellite images. The images can originate from a plurality of different sources (such as different satellite systems). Therefore, the storage component 10 can have a plurality of sub-components, each corresponding to a separate database or the like. Note, that the storage component 10 can comprise a database located on an online server and/or a collection of servers such as a cloud. Additionally or alternatively, the storage component 10 can comprise a physical storage device such as a hard drive.

The processing component 20 can comprise a processor in a computer and/or a server. The processing component 20 can be programmed to execute all of the steps of the algorithm resulting in identifying on-street parking spots. Note, that the processing component 20 can also comprise a local and/or a cloud-based processor.

The output component 30 can comprise a user interface that is configured to display the results of the algorithm identifying parking spots and/or further information such as parking occupancy. The output component 30 can comprise a browser, an app, or a front end of a program designed to run on a computing device such as a smartphone, a laptop, a driver assistance system, a tablet, a GPS unit or the like. Additionally or alternatively, the output component 30 can also comprise a back end serving another application or program, that is, an API.

FIG. 3 depicts a more detailed embodiment of step S1 shown in FIGS. 1a and 1b. Satellite images 12 are input into a submodule image retrieval S11. First, this submodule connects to all available databases that store satellite images 12, and requests all images that cover a predefined area. The databases can be locally stored, or they might be located at external partners, e.g., satellite provides, and connected by a defined API. The submodule also requests a number of features for each image such as:

1. Exact data and time when the image was captured.
2. Average cloud coverage of the image.
3. Satellite provider, name, and GSD (ground sampling distance).
4. Satellite offNADIR angle of the image.
5. Sun elevation.
6. Sun azimuth.

In case some of the above-mentioned features are not available for an image, the module attempts to fill this missing value from another database.

From there, a submodule image quality check S12 takes over. In this submodule, a quality control is performed. In this step, satellite images, or parts of the images that do not meet requirements for further analysis are excluded. This can also be referred to as quality benchmarking. Additional features about images might be counted in this step, and additional information about the area of interest might be used to count these features, e.g., average building height in the area together with sun azimuth and sun elevation might be used to count the probability that further analysis will be affected by shadows. Example of potential image requirements comprise:

1. Cloud coverage below a threshold.
2. Satellite offNADIR in defined range.
3. Sun azimuth and elevation in a predefined range.
4. Probability of large portion area covered by shadow below a threshold.

Following quality benchmarking, image georeferencing S13 is performed. Images that successfully pass the QC (quality control) phase are then georeferenced. Existing georeferencing algorithms can be used for this. These algorithms can be based on providing automatic/automated tie point search between satellites, and estimate a model relating ground coordinates to image coordinates.

Figure 4C:
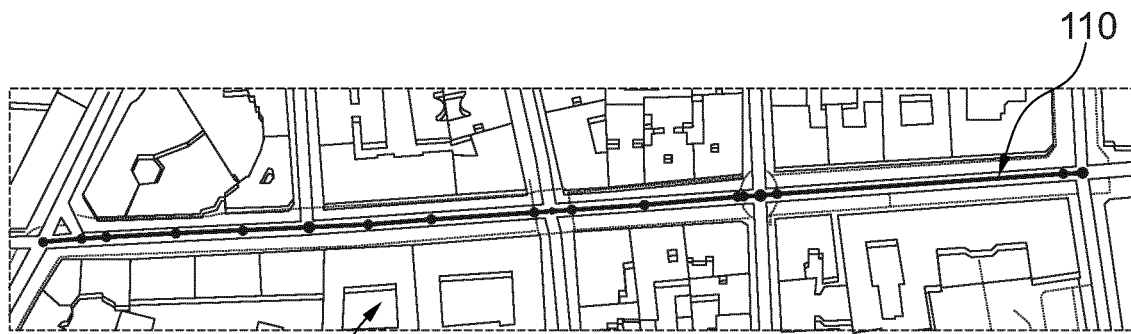
FIGS. 4c and 4d similarly depict embodiments of step S2, exemplifying computing street sections based on map data.
Figure 4D:
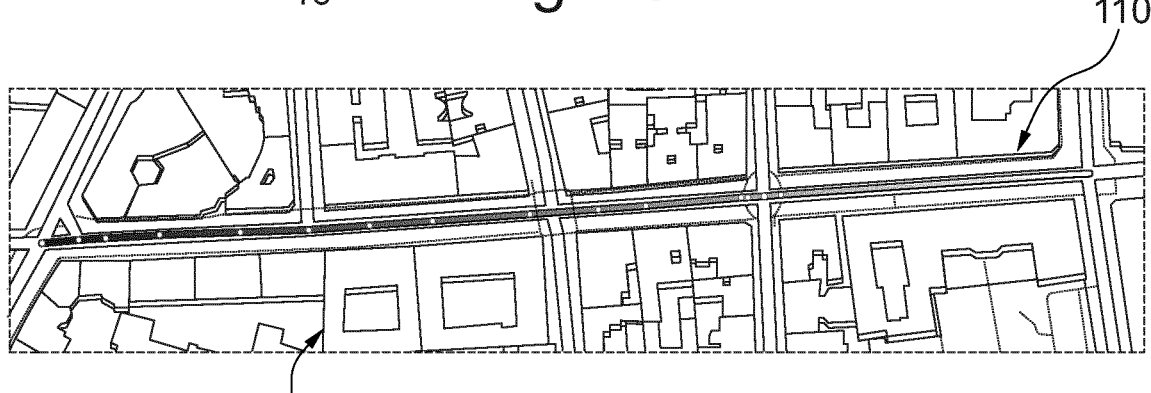

FIGS. 4a to 4d depict embodiments of step S2 as shown in FIG. 1a. Note, that FIGS. 4a and 4b show image processing, while FIGS. 4c and 4d show map data processing. In step S2, objects are identified and surface segmentation of satellite images into surfaces is performed. Furthermore, map data is used to extract a plurality of street sections. Note, that all of those outputs are independent, and can be computed in parallel.

FIG. 4a demonstrates an embodiment of the detected objects 100 in an exemplary satellite image 12. Here, the detected objects of interest 100 comprise vehicles. However, they can also comprise other objects such as landmarks, buildings or similar structures. For the purpose of the present disclosure, the objects of interest 100 generally refer to vehicles 100. Existing object detection algorithms can be used to detect vehicles 100 and other objects of relevance, as well as their features. Examples of additional features include:

1. Coordinates of bounding box and centroid of the vehicle.
2. Class of the vehicle (e.g., personal, commercial).
3. Orientation of the vehicle.
4. Size of the area covered by the vehicle.

FIG. 4b depicts an exemplary image 12 divided into a plurality of surfaces. 110. Different colours indicate different types of terrain automatically recognized. Existing segmentation algorithms can be used to classify types of surfaces captured in an image. These algorithms identify areas on an image with the same surface, and classify them into predefined categories. These categories can include: urban, non-urban, clouds, water, roads, forest, building, etc.

FIGS. 4c and 4d depict map data 16 of an exemplary street with a plurality of sections 110. In FIG. 4c, map data 16 of a typical street is shown. The street is represented by a linestring (blue solid line). The linestring is defined as an order sequence of points (red dots). For further processing, each linestring has to be separated such that each new linestring contains exactly two points. In FIG. 4d, results of the separation algorithm applied on 4c is shown, and different sections are indicated by different colour shades.

Note, that map data 16 can correspond to publically available map data such as that provided by Open Street Map, and/or comprise proprietary map data.

Figure 5A:
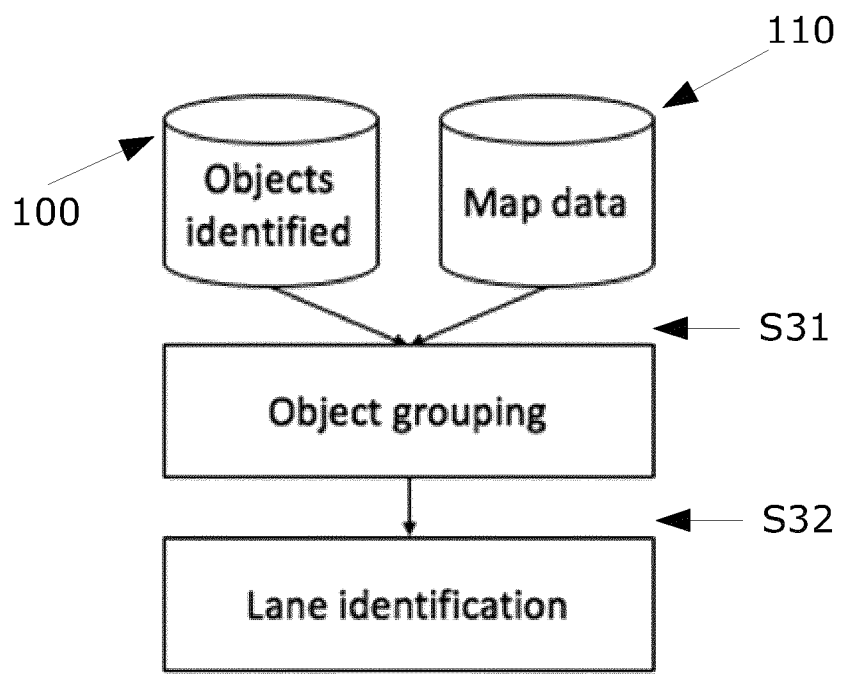

FIGS. 5a to 5c depict more detailed embodiments of step S3 as presented in FIG. 1a. The object of this subroutine is to identify on-street vehicle lanes in street sections.

FIG. 5a depicts a schematic flow of the present subroutine. Inputs comprise the identified objects 100 and map data comprising street sections 110. The inputs are fed into an object grouping subroutine S31. First, only street sections 110 where vehicles 100 are allowed to enter are extracted from the map data. This can be done based on the underlying map such as Open Street Map, or by other methods.

Second, recognized objects 100 and these street sections 110 are merged together. That is, for each object 100, the closest street section 110 is assigned to it. Special care must be taken when an object 100 is similarly close to two or more street sections 110, as libraries counting spatial distances have limited precision. In such cases, additional features of objects, e.g., vehicle orientation can be taken into account when assigning the closest street sections 110.

Then, a lane identification subroutine S32 is performed. This is described in more detail in FIGS. 5b and 5c, which depict more detailed representations of this submodule. First, empirical lane identification S321 is performed. This is followed by quality assurance S322 and lane adjustment S323. FIG. 5c presents step S321 in more detail. The empirical lane identification S321 subroutine comprises the following steps (as also illustrated by FIG. 5c).

1. Set number of on-street vehicle lanes to k=1.
2. Divide all vehicles 100 into k lanes using hierarchical clustering based on distance between vehicles 100 and/or distance between vehicles 100 and street sections 110 and/or distance to other objects of interest identified on image.
3. Using total least squares, estimate lines that pass through centroids of vehicles 100 assuming that each line represent one lane, all lines have identical slope, and only their intercept (that is, the offset between them) differs.
4. Count the error of the model from the previous point. If the error is over a certain threshold, and k is lower than number of vehicles 100, increase k, and go to point 2.

5. Write down the assignment of each vehicle 100, and slope and intercepts of estimated on-street vehicle lanes.

Back to FIG. 5*b*, for each street section 110, its slope (bearing) is compared with the slope of the empirical lane identified in the previous step S321. If the difference is too high, the street section 110 is flagged. This happens, e.g., in situations when there are only few vehicles 100 identified on a street section 110. In this way, quality assurance S322 is performed.

Finally lanes flagged during quality assurance S322 are adjusted as in step S323. If a street section is flagged, a similar non-flagged section or sections are identified (based on bearing of the sections and other section features), and Empirical lane identification S321 is performed again, but this time stop criteria penalize estimated slope using slopes of similar sections.

Figure 5E:
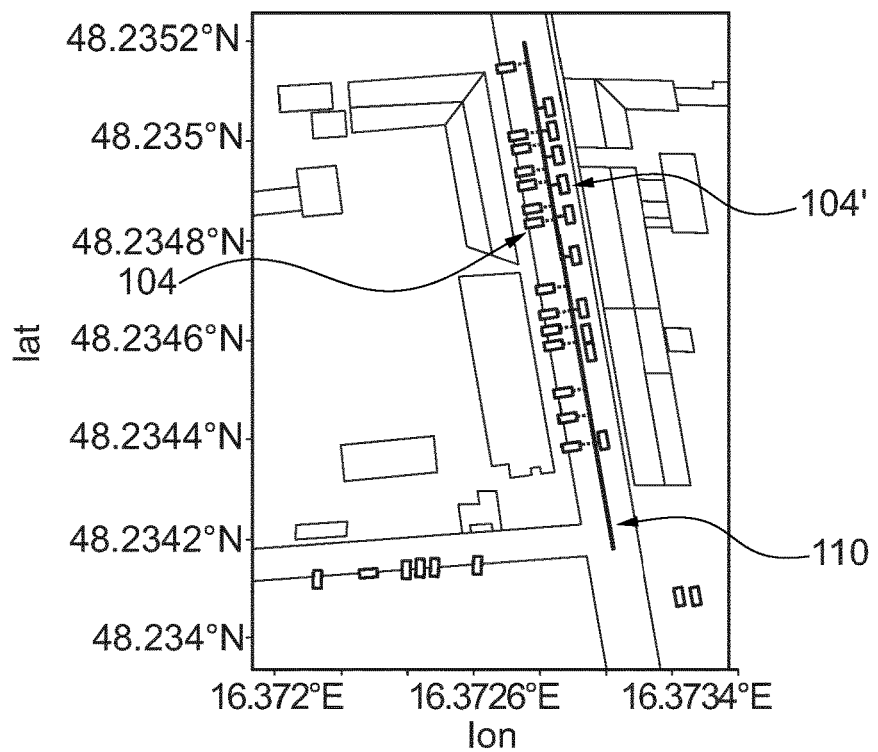
Figure 5F:
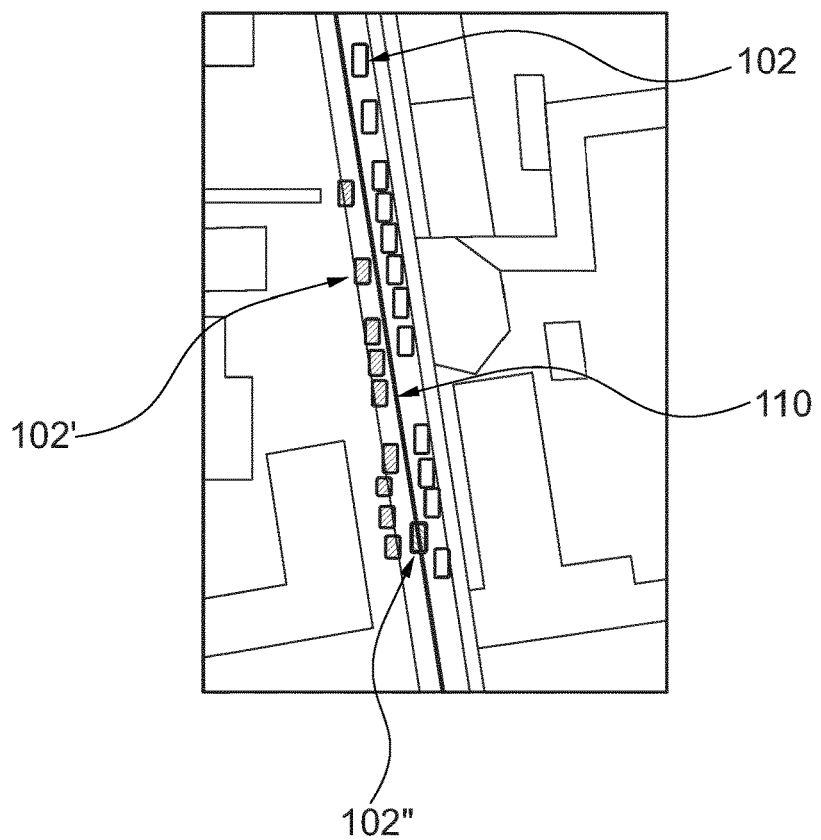

FIGS. 5*d* to 5*f* depict typical outputs of step S3 as depicted in FIG. 1*a*.

FIG. 5*d* depicts an exemplary output of matching vehicles 100 to street sections 110 as part of the object grouping step S31. Vehicles 100 matched to the same street section 110 are marked with the same colour.

FIG. 5*e* depicts another part of the object grouping step S31. Vehicles matched to one street section 110 are identified as belonging to its one side or another. Left side vehicles 104 (shown on the left side of the figure) are shown with a red line, and right side vehicles 104' (shown on the right side of the figure) are shown with a green line.

FIG. 5*f* depicts a typical final output of the on-street vehicle lane identification module. A street section 110 is shown as a line through the satellite image. Vehicles 102 are grouped to a first lane, vehicles 102' to a second line, and vehicle 102" to a third lane. Note, that the third lane comprises only one vehicle.

Figure 6A:
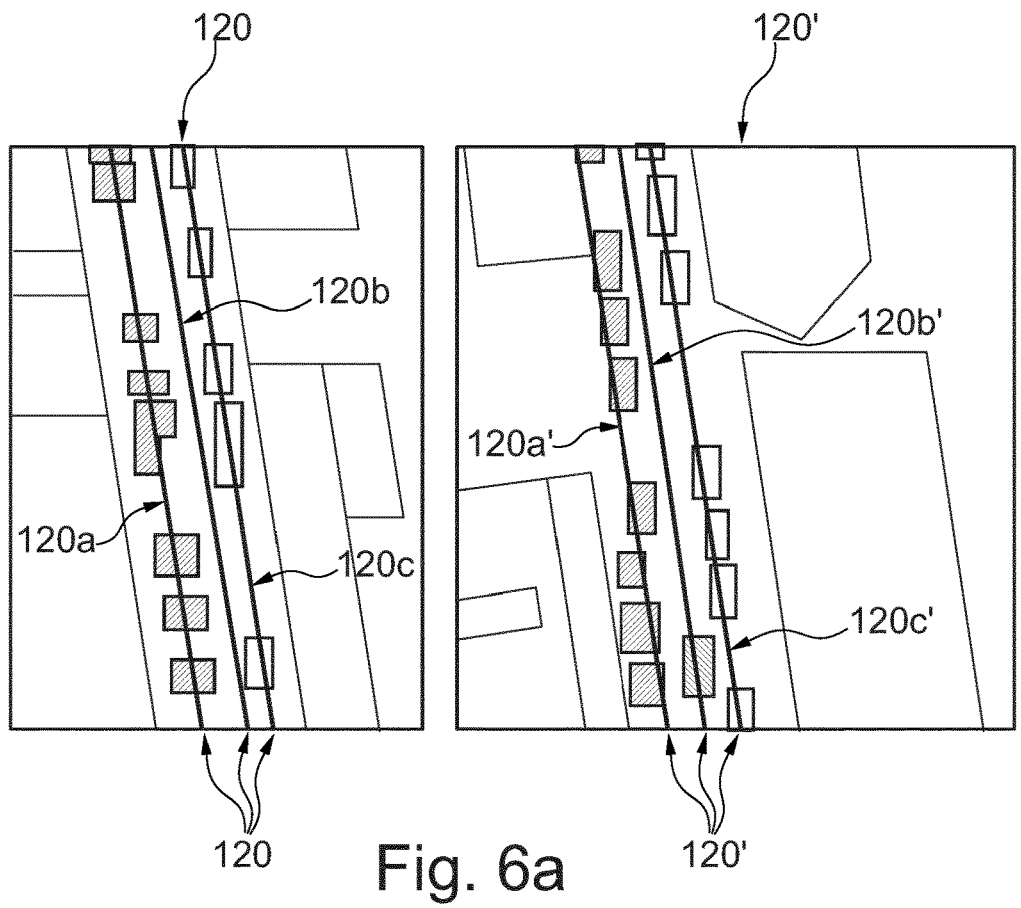
FIGS. 6a and 6b depict embodiments of step S4 as depicted in FIG. 1a, detailing combining of the on-street traffic lanes from different satellite images.
Figure 6B:
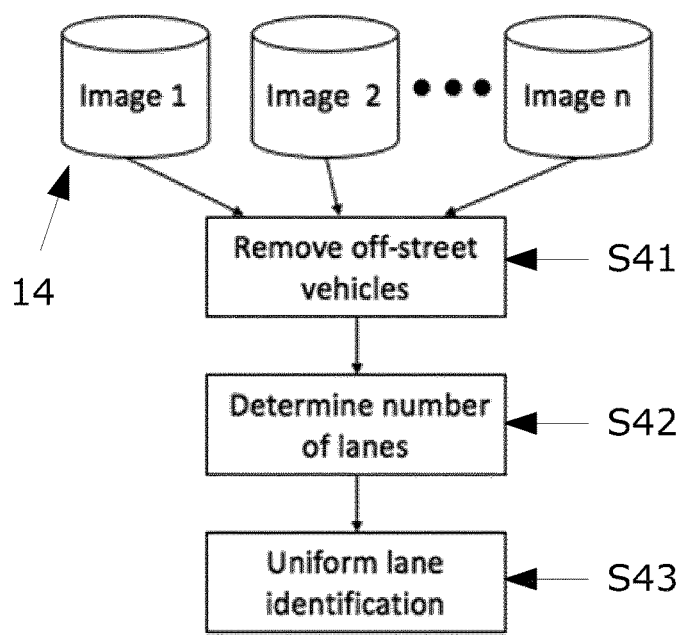

FIGS. 6*a* and 6*b* depict exemplary and more detailed embodiments of S4 as shown in FIG. 1*a*. That is, they depict consolidation of on-street vehicle lanes from different street sections.

This module combines data coming from multiple images, and it creates a uniform notation for on-street vehicle lanes 120 across images, as same lane might have different IDs on data from different locations.

FIG. 6*a* shows two satellite images of a same area (with a different timestamp) with estimated lanes 120, 120' (with the individual lines denoted 120*a*, 120*b*, 120*c* and 120*a*', 120*b*', 120*c*' left to right respectively). On the left image, there are red vehicles assigned to lane 120*a* and blue vehicles assigned to lane 120*c*. On the right figure, there are red vehicles assigned to lane 120*a*', green to 120*b*', and blue to 120*c*'. The middle lane on the left image (lane 120*b*) is artificial, and comprises an output of the whole module. That is, even if one street section did not have a certain lane (based on the vehicles present in it), it can be added in based on the different street sections (and/or different images).

FIG. 6*b* depicts a more detailed breakdown of the lane consolidation submodule. A plurality of satellite images 14 serve as inputs. In S41, off-street vehicles are removed. If vehicles 100 located off-street are assigned to the street sections 110, they are assigned to one or more separate lanes. These lanes can be easily identified, as their intercepts (that is, offset with respect to the other lanes) are much higher in absolute value than intercept of vehicle lanes 120. Then, the number of lanes 120 is determined in step S42. As the number of images increases, this number will simply approach a maximal number of lanes 120, since the probability that there is at least one picture where each lane 120 is occupied increases. If the number of pictures is low, additional information about street sections 110 might be taken in to account and the number of lanes 120 is determined based on offsets of estimated lanes.

In step S43, lane identification is established. Here, uniform lane number is assigned to lanes, so that lane number 1 is the leftmost vehicle lane, and the rightmost vehicle lane gets the highest number. E.g, on FIG. 6*a*, lane 1 is 120*a* and 120 *a*', 2-120*b* (artificial) and 120*b*', etc.

Figure 7A:
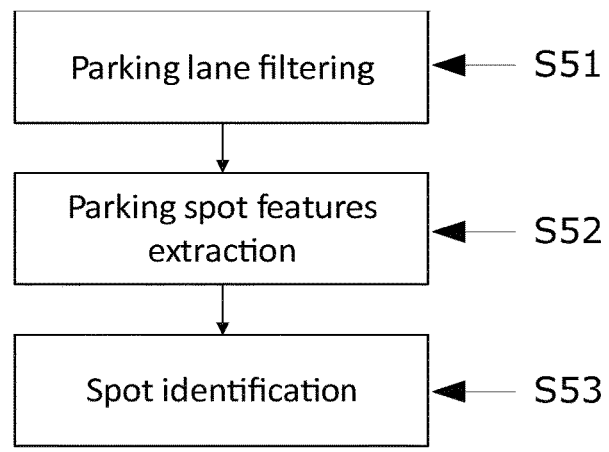
FIGS. 7a to 7c depict embodiments of step S5 as depicted in FIG. 1a, detailing identifying parking lanes and deriving individual parking spots.
Figure 7B:
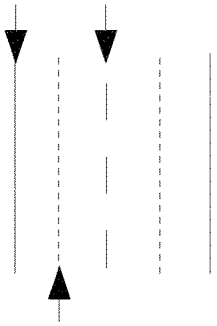
Figure 7C:

FIGS. 7*a* to 7*c* depict more detailed and exemplary embodiments of step S5 as shown in FIG. 1*a*. That is, parking lanes 150 are identified and parking spaces 152 derived. This module can be run independently on each street section 110 (but use data from all satellite images 14 covering this section) and all vehicles 100 assigned to this street section 110.

FIG. 7*a* shows a more detailed overview of step S5. Parking lane filtering subroutine S51 comprises determining which on-street vehicle lanes 120 are parking lanes 150. From the previous module (the one described in relation to FIGS. 6*a* and 6*b*), there is a uniform notation of on-street vehicle lanes 120. Obviously, only vehicles in the leftmost and rightmost lanes might be used for parking. Hence, vehicles 100 from inner lanes 140 are removed from the data set.

In the second step, these potential parking lanes are confirmed to contain parked cars. This is done based on:
Distribution of the distance between identified vehicles 100, as mutual distance of vehicles that are parked and that are moving differs;
Distribution of distances of these vehicles to other objects of interest;
Results of segmentation algorithms around the lane.

At the end of the process, a list of all parking lanes 150 that are used for parking in an area is obtained.

Parking spot features extraction submodule S52 comprises extracting information about additional features for each parking lane 150. The additional information can comprise:
1. Minimal and mean distance between two neighbouring vehicles,
2. Mean orientation of vehicles, and distribution of orientation off all vehicles in a lane.

Spot identification submodule S53 comprises using the features extracted in the previous submodule to identify parking spots 152.

FIG. 7*b* schematically depicts a typical street. Two parking lanes 150 are present on the extremities. In the middle, street middle line 130 is shown. Between the two on each side, moving traffic lane 140 or traffic lane 140 is depicted.

FIG. 7*c* depicts a typical result of step S5 as shown in FIG. 1*a*. Parking spots 152 and 152' are identified in the depicted satellite image. Note, that parking spots 152 are configured for diagonal or perpendicular parking, while parking spots 152' are configured for parallel parking.

LIST OF REFERENCE NUMERALS

10—Storage component
12—Storage database
14—Image
20—Processing component
30—Output component
100—Detected object of interest/vehicle
102, 102', 102"—Vehicle grouped to street section
104, 104'—Vehicle assigned to street section side
110—Street section
120, 120'—On-street vehicle lanes

120a, 120b, 120c, 120a', 120b', 120c'—Specific detected lanes
130—Street middle line
140—Moving traffic lane
150—Parking lane
152, 152'—Parking spot Whenever a relative term, such as "about", "substantially" or "approximately" is used in this specification, such a term should also be construed to also include the exact term. That is, e.g., "substantially straight" should be construed to also include "(exactly) straight". Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

The invention claimed is:

1. A method for identifying and evaluating on-street parking spots of an area based on at least one of satellite and aerial images of said area, the method comprising
retrieving and processing a plurality of at least one of satellite and aerial images by at least quality benchmarking and georeferencing the images; and
for each image, detecting objects of interest comprising at least detected vehicles, computing street sections based on map data corresponding to the images, and assigning the detected objects to at least street sections; and
for each street section, identifying on-street vehicle lanes based on the detected objects of interest; and
combining street sections based on the on-street vehicle lanes from the plurality of at least one of satellite and aerial images; and
in the combined sections, identifying parking lanes and deriving individual parking spots comprised thereon, and
computing availability of parking spaces in a given neighborhood at a given time.

2. The method according to claim 1 further comprising consolidating and interpreting data related to the identified individual parking spots.

3. The method according to claim 1 further comprising computing parking space occupancy of the identified parking lanes.

4. The method according to claim 1 further comprising using a plurality of at least one of satellite and aerial images of an area taken over a certain period of time to identify at least time-dependent parking space availability.

5. The method according to claim 1 further comprising identifying parking rules based on the interpreted identified individual parking spots.

6. A method for identifying on-street parking spots of an area based on at least one of satellite and aerial images of said area, the method comprising
retrieving and processing a plurality of at least one of satellite and aerial images by at least quality benchmarking and georeferencing the images, and
for each image, detecting objects of interest comprising at least detected vehicles, computing street sections based on map data corresponding to the images, and assigning the detected objects to at least street sections, and
for each street section, identifying on-street vehicle lanes based on the detected objects of interest, and
combining street sections based on the on-street vehicle lanes from the plurality of at least one of satellite and aerial images, and
in the combined sections, identifying parking lanes and deriving individual parking spots comprised thereon,
wherein identifying on-street vehicle lanes further comprises computing a closest street section for each detected vehicle and recursively identifying on-street vehicle lanes based on a plurality of vehicles present in each street section.

7. The method according to claim 6 wherein the recursively identified on-street vehicle lanes are quality controlled by at least comparing their slope with that of the respective street section.

8. The method according to claim 7 wherein the recursively identified on-street vehicle lanes not compliant with the quality control are further compared to similar lanes compliant with the quality control and adjusted to comply as well by recursively adapting their slope.

9. A method for identifying on-street parking spots of an area based on at least one of satellite and aerial images of said area, the method comprising
retrieving and processing a plurality of at least one of satellite and aerial images by at least quality benchmarking and georeferencing the images, and
for each image, detecting objects of interest comprising at least detected vehicles, computing street sections based on map data corresponding to the images, and assigning the detected objects to at least street sections, and
for each street section, identifying on-street vehicle lanes based on the detected objects of interest, and
combining street sections based on the on-street vehicle lanes from the plurality of at least one of satellite and aerial images, and
in the combined sections, identifying parking lanes and deriving individual parking spots comprised thereon,
wherein combining street sections comprises inputting a plurality of intersecting images, removing vehicles likely located off-street, and consolidating on-street vehicle lanes between the street sections and wherein identifying parking lanes further comprises computing the distance between the vehicles located in each on-street vehicle lane and wherein the method further comprises assigning an identification parameter to each on-street vehicle lane.

10. A method for identifying on-street parking spots of an area based on at least one of satellite and aerial images of said area, the method comprising
retrieving and processing a plurality of at least one of satellite and aerial images by at least quality benchmarking and georeferencing the images, and
for each image, detecting objects of interest comprising at least detected vehicles, computing street sections based on map data corresponding to the images, and assigning the detected objects to at least street sections, and
for each street section, identifying on-street vehicle lanes based on the detected objects of interest, and combining street sections based on the on-street vehicle lanes from the plurality of at least one of satellite and aerial images, and in the combined sections, identifying parking lanes and deriving individual parking spots comprised thereon, wherein identifying individual parking spots comprises computing a mean and minimal distance between neighboring vehicles and determining orientation of parked vehicles with respect to their respective parking lane.

11. A method for identifying on-street parking spots of an area based on at least one of satellite and aerial images of said area, the method comprising retrieving and processing a plurality of at least one of satellite and aerial images by at least quality benchmarking and georeferencing the images; and detecting vehicles and street sections in the georeferenced images; and identifying on-street vehicle lanes based on the detected street sections and vehicles; and identifying parking lanes and deriving individual parking spots on them; and consolidating data from the plurality of at least one of satellite and aerial images of the area to compute an average parking occupancy in said area, wherein identifying on-street vehicle lanes comprises recursively assigning vehicles on a given street section to possible on-street vehicle lanes until an optimal solution yielding at least one lane is obtained.

12. A method for identifying on-street parking spots of an area based on at least one of satellite and aerial images of said area, the method comprising retrieving and processing a plurality of at least one of satellite and aerial images by at least quality benchmarking and georeferencing the images, and detecting vehicles and street sections in the georeferenced images, and identifying on-street vehicle lanes based on the detected street sections and vehicles, and identifying parking lanes and deriving individual parking spots on them; and consolidating data from the plurality of at least one of satellite and aerial images of the area to compute an average parking occupancy in said area, wherein the parking spot derivation comprises at least computing distance between nearest neighbor vehicles on each parking lane, determining types of vehicles and parking orientation and obtaining an average parking spot with a corresponding size based on the above.

13. A computer-implemented system for identifying on-street parking spots based on at least one of satellite and aerial images, the system comprising a storage component configured to store a plurality of at least one of satellite and aerial images and map data; and a processing component configured for retrieving and processing a plurality of at least one of satellite and aerial images from the storage component by at least quality controlling and georeferencing the images; and for each image, detecting objects of interest comprising at least detected vehicles, computing street sections based on map data corresponding to the images, and assigning each detected object to a street section for each street section, identifying on-street vehicle lanes based on the detected objects of interest; and combining street sections based on the on-street vehicle lanes from the plurality of at least one of satellite and aerial images; and in the combined sections, identifying parking lanes and individual parking spots comprised thereon;

an output component configured to output the individual parking spots determined by the processing component, wherein the processing component is further configured for computing availability of parking spaces in a given neighborhood at a given time.

14. The method according to claim 11 further comprising deriving rules related to parking from the consolidated data.

15. The method according to claim 11 further comprising consolidating the detected street sections with the respective identified lanes and identifying the parking lanes as the outermost lanes in the resulting consolidated street sections.

16. The system according to claim 13 wherein the processing component is further configured for identifying parking rules based on the identified individual parking spots.

17. The system according to claim 13 wherein the output component comprises at least one of an application for a user's personal computing device that assists a user with parking spot finding; and an interface, for third parties to obtain access to known parking spots in a given area.

* * * * *